(12) United States Patent
Kleinikkink et al.

(10) Patent No.: US 12,091,259 B2
(45) Date of Patent: Sep. 17, 2024

(54) SYSTEM AND METHOD FOR CONVEYOR SYSTEM CONFIGURATION, TESTING AND DIAGNOSTICS

(71) Applicant: ATS CORPORATION, Cambridge (CA)

(72) Inventors: Stanley Kleinikkink, Cambridge (CA); Javan Taylor, Cambridge (CA); Imran Ahmed, Cambridge (CA)

(*) Notice: Subject to any disclaimer, the term of this patent is extended or adjusted under 35 U.S.C. 154(b) by 158 days.

(21) Appl. No.: 17/851,242

(22) Filed: Jun. 28, 2022

(65) Prior Publication Data

US 2023/0002167 A1 Jan. 5, 2023

Related U.S. Application Data

(60) Provisional application No. 63/216,992, filed on Jun. 30, 2021.

(51) Int. Cl.
*G05B 23/02* (2006.01)
*B65G 43/02* (2006.01)

(52) U.S. Cl.
CPC ...... *B65G 43/02* (2013.01); *B65G 2203/0275* (2013.01); *B65G 2203/0291* (2013.01); *B65G 2203/045* (2013.01)

(58) Field of Classification Search
CPC B65G 43/02; B65G 2203/0275; G05B 23/02; G05B 23/0294
See application file for complete search history.

(56) References Cited

U.S. PATENT DOCUMENTS 11,403,541 B2 * 8/2022 Thomsen .......... G05B 19/41885
11,520,571 B2 * 12/2022 Mathews .............. G06Q 10/063
11,588,917 B2 * 2/2023 Walter .................. H04L 67/565
(Continued)

FOREIGN PATENT DOCUMENTS

CN 106383916 A 2/2017
WO WO 2022/087592 A1 * 4/2022

OTHER PUBLICATIONS

US 2020/0265329 A1, Thomsen et al., Aug. 20 (Year: 2020).*
(Continued)

*Primary Examiner* — Douglas A Hess
(74) *Attorney, Agent, or Firm* — Amarok IP Inc.; Neil W. Henderson

(57) ABSTRACT

A system and method for conveyor configuration and testing. The system is configured to execute the method, which includes: receive input data relating to configuration of a conveyor system; prepare a simulation of the configured conveyor system; operate the simulation of the conveyor system; determine at least one operational parameter related to the conveyor system to be monitored; monitor the at least one operational parameter during operation of the simulation of the conveyor system; determine if the configuration of the conveyor system needs to be adjusted based on the monitored operational parameter; if the configuration needs to be adjusted, automatically make an adjustment and return to operate the simulation of the conveyor system; and continue the simulation until otherwise terminated. In some cases, the monitoring operational parameters uses a machine learning model based on actual data from operating conveyors.

12 Claims, 14 Drawing Sheets

(56) References Cited

U.S. PATENT DOCUMENTS

| | | | |
|---|---|---|---|
| 11,774,946 B2 * | 10/2023 | Chand | G05B 19/0426 700/275 |
| 2009/0210081 A1 | 8/2009 | Sustaeta et al. | |
| 2020/0265329 A1 | 8/2020 | Thomsen et al. | |
| 2021/0182995 A1 | 6/2021 | Cella et al. | |

OTHER PUBLICATIONS

US 2020/0371501 A1, Thompson et al., Nov. 26 (Year: 2020).*
US 2021/0341896 A1, Miklosovic et al., Nov. 4 (Year: 2021).*
US 2022/0197255 A1, Cella et al., Jun. 23 (Year: 2022).*
US 2023/0213922A1, Bharadwaj et al., Jul. 6 (Year: 2023).*
US 2023/0416012 A1, Beyak et al., Dec. 28 (Year: 2023).*
European Search Report, European Patent Office, on corresponding EP Application No. 22181480.9, dated Nov. 30, 2022.

* cited by examiner

Fig. 6

SYSTEM AND METHOD FOR CONVEYOR SYSTEM CONFIGURATION, TESTING AND DIAGNOSTICS

FIELD

The present disclosure relates generally to a system and method for configuration, testing and diagnostics of automation equipment. More particularly, the present disclosure relates to a system and method for conveyor configuration, testing and diagnostics.

BACKGROUND

Modern manufacturing and automation systems and processes are becoming more complex, at least in part because these systems and processes are required to be fast, accurate and repeatable over longer periods of time. These systems and processes are expected to provide appropriate product quality in short time frames. These automation systems and processes also seek to provide high machine efficiency with low downtime for maintenance, trouble-shooting and the like. For existing manufacturing and automation systems and processes, there is also a trend to provide on-going improvement in one or more of these factors in order to keep pace with the changing manufacturing environment.

Some manufacturing and automation systems have complex requirements with respect to size and speed. When designing these systems, typically many parameters may need to be configured, monitored and/or adjusted to accommodate the manufacturing processes and the automation system. Further, as there tends to be significant capital expenditure needed for any purchase or modification of an automation system, purchasers prefer to ensure that the automation system will be capable of operation for the intended purpose at an appropriate throughput.

While some systems and methods for configuring automation equipment are known, they tend to be limited, for example, to modeling a system with significant manual configuration that can take a substantial amount of time.

As such, there is a need for improved systems and methods for configuring and diagnosing automation equipment in manufacturing and automation systems.

SUMMARY

According to an aspect herein, there is provided a method for conveyor configuration and testing, the method including: receive input data relating to configuration of a conveyor system; prepare a simulation of the configured conveyor system; operate the simulation of the conveyor system; determine at least one operational parameter related to the conveyor system to be monitored; monitor the at least one operational parameter during operation of the simulation of the conveyor system; determine if the configuration of the conveyor system needs to be adjusted based on the monitored operational parameter; if the configuration needs to be adjusted, automatically make an adjustment and return to operate the simulation of the conveyor system; and continue the simulation until otherwise terminated.

In some cases, the monitor the at least one operational parameter uses a machine learning model, the machine learning model may include: at least one factor including current levels in the conveyor system; a physics model for determining simulated current; and a regression model for determining temperature based on the simulated current.

In some cases, the at least one operational parameter may include at least one of power usage per motor and temperature.

In some cases, the determine if the configuration of the conveyor needs to be adjusted may include: determine if one of the operational parameters is outside of a predetermined range; and determine a change in at least one configuration parameter in order to change the operational parameter.

In some cases, the automatically make an adjustment may include: adding an additional element to the configuration in order to change the operational parameter.

According to another aspect herein, there is provided a method for conveyor configuration and testing, the method including: receive input data relating to configuration of a conveyor system; determine configuration parameters related to the conveyor system based on the input data; configure the conveyor system based on the configuration parameters; provide for changes to the configuration parameters; display the configuration of the conveyor system; simulate operation of the conveyor system; monitor at least one operational parameter related to the conveyor system, wherein the at least one operational parameter is calculated based on the configuration parameters and a machine learning model based on operational data from actual conveyors; determine if configuration parameters need to be adjusted based on the at least one operational parameter; if the configuration parameters need to be adjusted, return to receive input data, otherwise, continue the simulation until otherwise terminated.

In some cases, the machine learning model may include: at least one factor including current levels in the conveyor system; a physics model for determining simulated current; and a regression model for determining temperature based on the simulated current.

In some cases, the at least one operational parameter may include at least one of power usage per motor and temperature.

In some cases, the provide for changes may include: determine if the configuration parameters allow a functional conveyor system; and allow adjustment of configuration parameters by returning to receive input data.

In some cases, the determine if configuration parameters need to be adjusted may include:

determine if one of the at least one operational parameter is outside of a predetermined range; and suggest a change in at least one configuration parameter in order to change the at least one operational parameter. In this case, the suggest a change in at least one configuration parameter may include: suggest an additional element to add to the configuration in order to change the at least one operational parameter.

According to one aspect herein, there is provided a system for conveyor configuration and testing, the system including: a data acquisition module configured to receive input data relating to configuration of a conveyor system; a configuration module configured to prepare a digital two-dimensional model of a conveyor system; simulation module configured to run a simulation of the configured conveyor system, monitor at least one operational parameter during operation of the simulation of the conveyor system, and determine if the configuration of the conveyor system needs to be adjusted based on the monitored operational parameter; and a results module configured to, if the configuration needs to be adjusted, automatically make an adjustment and return control to the configuration module, otherwise, to return to the simulation module to continue the simulation until otherwise terminated.

In some cases, the simulation module may include a machine learning model and the machine learning module may include: at least one factor including current levels in the conveyor system; a physics model for determining simulated current; and a regression model for determining temperature based on the simulated current.

In some cases, the results module is configured to automatically make an adjustment by adding an additional element to the configuration in order to change the at least one operational parameter.

In some cases, the at least one operational parameter may include at least one of power usage per motor and temperature.

Other aspects and features of the embodiments of the system and method will become apparent to those ordinarily skilled in the art upon review of the following description of specific embodiments in conjunction with the accompanying figures.

BRIEF DESCRIPTION OF THE FIGURES

Embodiments of the system and method will now be described, by way of example only, with reference to the attached Figures, wherein:

FIG. 6 illustrates data per automation station that can be generated when running a simulation;

DETAILED DESCRIPTION

Figure 1:
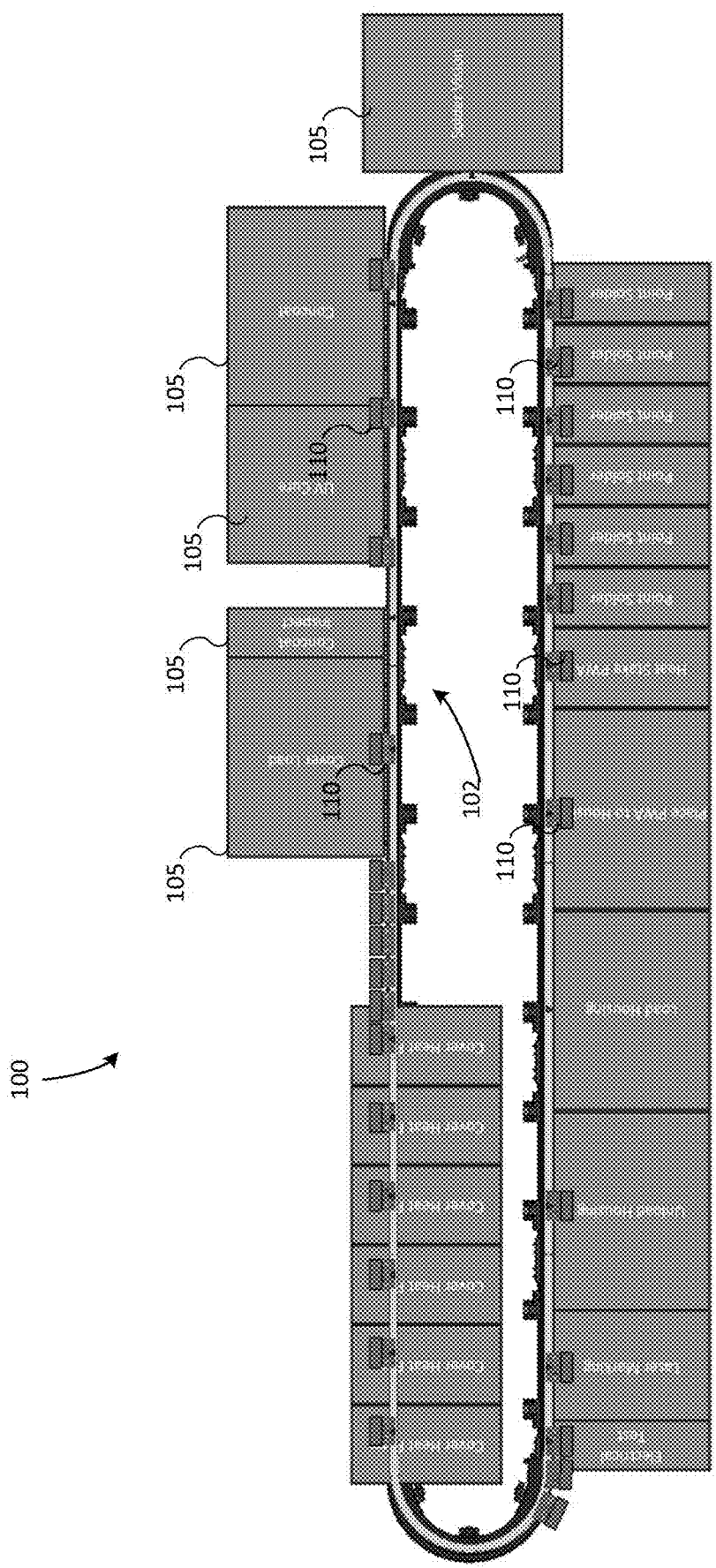
FIG. 1 is a diagram illustrating an example of a configured conveyor system produced by a system and method for conveyor configuration, testing and diagnosis according to an embodiment.

The following description, with reference to the accompanying drawings, is provided to assist in understanding the example embodiments. The following description includes various specific details to assist in that understanding but these are to be regarded as merely examples. Accordingly, those of ordinary skill in the art will recognize that the various embodiments described herein and changes and modifications thereto, including the use of elements of one embodiment with elements of another embodiment, can be made without departing from the scope and spirit of the appended claims and their equivalents. In addition, descriptions of well-known functions and constructions may be omitted for clarity and conciseness.

The terms and words used in the following description and claims are not limited to their bibliographical meanings but are meant to be interpreted in context and used to enable a clear and consistent understanding.

Generally, the present document provides for a system and method for designing, configuring and diagnosing conveyor systems for use in automation. In particular, one example of a conveyor that is becoming popular in automation is a linear motor conveyor. Conveyors in an automation environment will typically have a plurality of automation stations place along the conveyor and will have a variety of parameters that can be configured, monitored, diagnosed and adjusted. These parameters generally need to be configured properly in order for the conveyor and related automation stations to properly function and, further, the parameters generally need to be monitored over time for diagnosis, error detection and the like.

It will be understood that automation stations are used on manufacturing or production lines to handle manufacturing operations. An automation station may include a single piece of equipment/machine in a production line, such as a press, pick & place device or the like, but may also include a complex system involving robots, conveyors, manipulators, and the like. Further, the automation station may receive a moving element, which may include at least one carrier/pallet per moving element configured to move a part into and/or out of an automation station. Generally speaking, automation stations/equipment have been difficult to manage, due to the various interactions of the equipment with parts and the typically large amount of data required to review, understand and predict maintenance and potential issues or failures involving the equipment.

Conventional systems for the configuration of conveyors and assembly lines generally have difficulty analyzing configurations of conveyor systems, including linear motor conveyor systems, with a level of specificity or granularity that may be required to determine whether a conveyor system would be operable given various parameters that may need to be configured or adjusted within the overall system. Many parameters are required to be considered during a design and configuration of a conveyor system. For example, parameters such as spacing, timing, trajectory, temperature, collision avoidance and the like, play a role in the final configuration of the conveyor system.

FIG. 1 shows an example configuration of a conveyor system 100. In this case, the conveyor system is a linear motor conveyor system including a track providing a linear motor that drives moving elements along the track using magnetic fields. The conveyor system (sometimes referred to as a production line) 100 generally includes a conveyor 102 and at least one automation station, or automation element, 105 (which in the current example includes 23 automation stations 105). As noted above, the automation stations 105 may be or include, for example, machines, sensors, devices, or equipment, or a combination of machines, devices, or equipment, or the like. Each automation station 105 may require a certain amount of processing time and may further include spacing and temperature requirements. As can be seen from FIG. 1, various types of automation stations require different spacing amounts. Further, automation stations may have a particular order. Further, for timing, cost and processing requirements, it may be beneficial to have a plurality of a type of automation station that performs one task (sometimes called "parallel processing" or "2-up or 3-up processing" or the like), while in other cases, there may be a single automation station that performs a task (sometimes called "serial processing" or the like).

The conveyor 102 includes moving elements 110 that are configured to travel on the conveyor 102, stopping at one or more target set points ("targets") that relate to various automation stations 105 in order to have the automation station function applied to an item or object ("part or product") being carried by the moving element 110. In some cases, there may further be loading or unloading stations where the products or items are placed on or removed from the moving elements. Designing and configuring a conveyor system 100 includes configuring various configuration parameters such that the moving elements will proceed through the one or more automation stations with a high throughput while reducing the number of positions where there are bottlenecks within the conveyor system 100. Further, the moving elements 110 are intended to move from position to position without colliding and ensuring, proper orientation for processing at each automation station. There are also various operational parameters that come into play once the conveyor system 100 is operating. For example, temperature of elements of the conveyor system is an example of an operational parameter that needs to be monitored during operation of the conveyor system. As the moving elements 110 move over the conveyor system 102, heat can be generated in various ways, such as contact between a moving element and a track of the conveyor system or due to the operation of the motors/drivers for the conveyor system or the like. An appropriate operating temperature is to be maintained in order to reduce wear and tear and down time for the conveyor system 100.

In configuring and diagnosing a conveyor system many configuration and operational parameters need to be managed and/or monitored in order to make sure that the conveyor system can operate and then optimize the throughput and functions of the operation of the conveyor system. In particular, prior to spending significant capital, customers of conveyor systems want to ensure that the conveyor system will work as required and will not experience excessive downtime. As such, embodiments of the system and method detailed herein are intended to provide for a configuration of the conveyor system given input parameters, operating parameters, and the like that will address the needs of the customer. Embodiments of the system and method detailed herein are further intended to provide a simulation of a completed conveyor system to determine whether there may be issues with any configuration or operational parameters, including spacing/layout, throughput, power, temperature or the like. Embodiments of the system and method can be further configured to receive data on an actual conveyor system built according to the configuration and review the data to determine any potential issues with the conveyor system and diagnose any problems that may be affecting the operational conveyor system.

Figure 2:
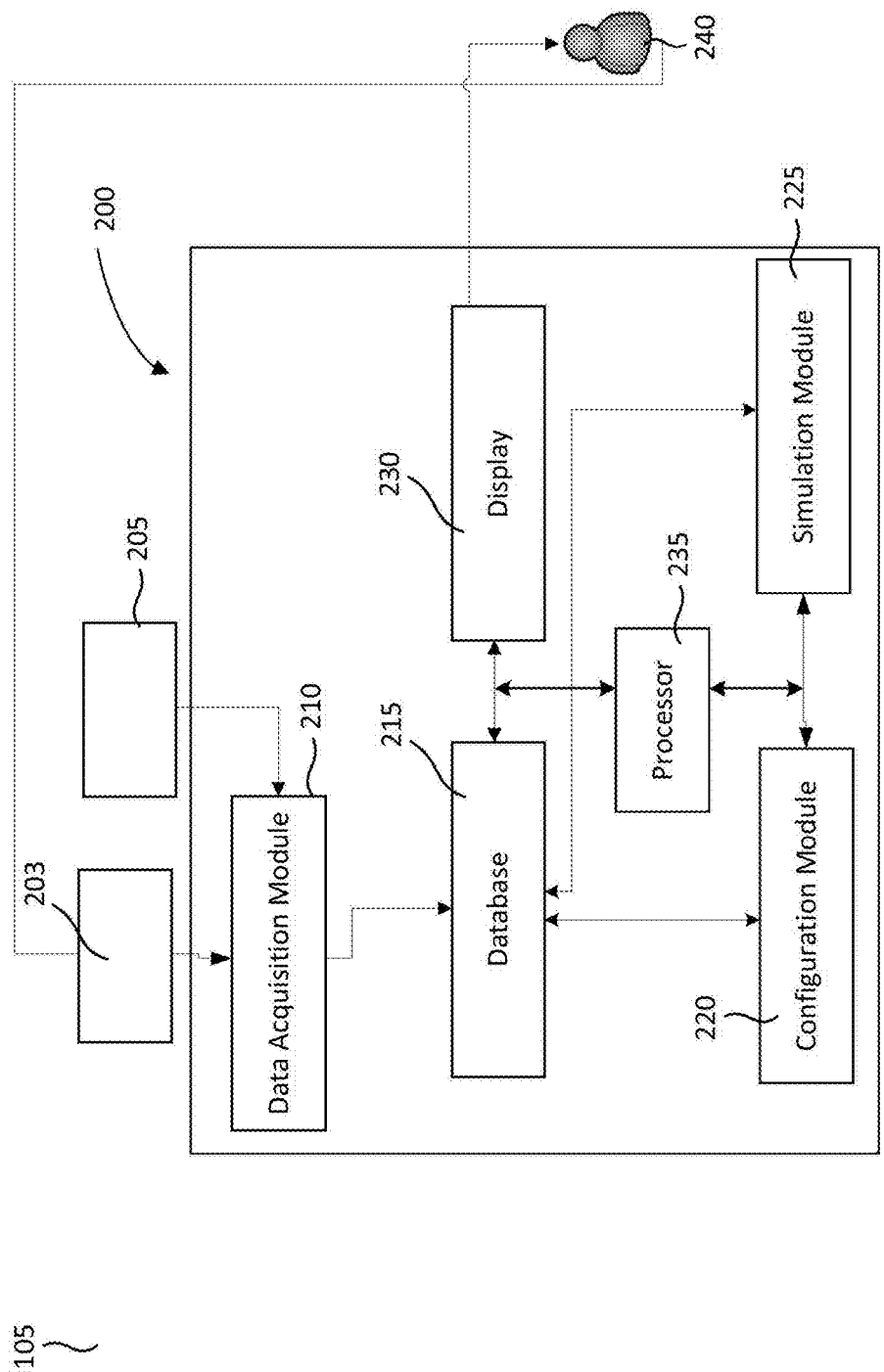
FIG. 2 is a block diagram illustrating an embodiment of a system for conveyor configuration, testing and diagnosis according to an embodiment.

FIG. 2 illustrates a system 200 for conveyor configuration, testing and diagnostics according to an embodiment. The system includes an input module 203, a connection to an external data source 205, a data acquisition module 210, a database 215, a configuration module 220, a simulation module 225, a display 230, and at least one processor 235.

The data acquisition module 210 is configured to allow input of and/or receive data related to various parameters related to a conveyor system. For example, there may be an input device 105 for inputting data related to automation stations that may be placed in the conveyor system. There may be access to one or more outside data sources 205 for data from third party data sources, for example site configuration, new equipment parameters and the like. The data acquisition module 210 may also obtain various parameters from the database 215 such as, for example, previously saved data relating to known or previously input conveyor system elements or the like. The input or received data may be stored in the database 215 or the like. As will be understood, the database 215 may be distributed across one or several memories and may be accessed via a network or the like.

The configuration module 220 is configured to review the input data to determine the parameters related to configuration of the conveyor system. The configuration module takes input data, for example, relating to size of work area, size of automation stations, number of automation stations, fixture size for parts being transported, throughput, ordering, timing, and the like and prepares a configuration of the conveyor system, including placing workstations and arranging the conveyor (track and moving elements) itself. The configuration module 220 displays a potential configuration of the conveyor system on the display 230 based on the configuration parameters. The configuration module 220 allows for further input and adjustments to be made with regard to the elements of the conveyor system, including at least the automation stations and the conveyor, by, for example, a user or users 240. In some cases, the system may provide for drag-and-drop functionality, for example, if a user wants to add a new automation station to the conveyor system or the like. After each change is made or after a group of changes are made, the configuration module 220 determines if the configuration of the conveyor system continues to be functional based on the parameters. Generally speaking, the configuration module 220 is configured to review the input data and configuration parameters and determine if there are any conditions (sometimes called "alerts") that might make it impossible or unlikely to provide a functioning conveyor system with the desired automation stations, desired throughput and the like. It will be understood that there may be many types of input data and related configuration parameters, including for example, products processed at each station at a time, the pitch between stopping locations of moving elements, parallel automation stations, station processing time, station reset time and the like.

The simulation module 225 is configured to simulate and analyze operation of the configured conveyor system. As the simulation module 225 operates a simulation of the conveyor system, the operation can be displayed on the display 230. The display may include a graphical representation of the operating conveyor system and possibly some of the operating parameters that are being monitored.

As described in further detail below, the configuration module 220 and the simulation module 225 may be further enhanced via machine learning, artificial intelligence or the like based on results from previously designed and implemented conveyor systems.

Figure 3:
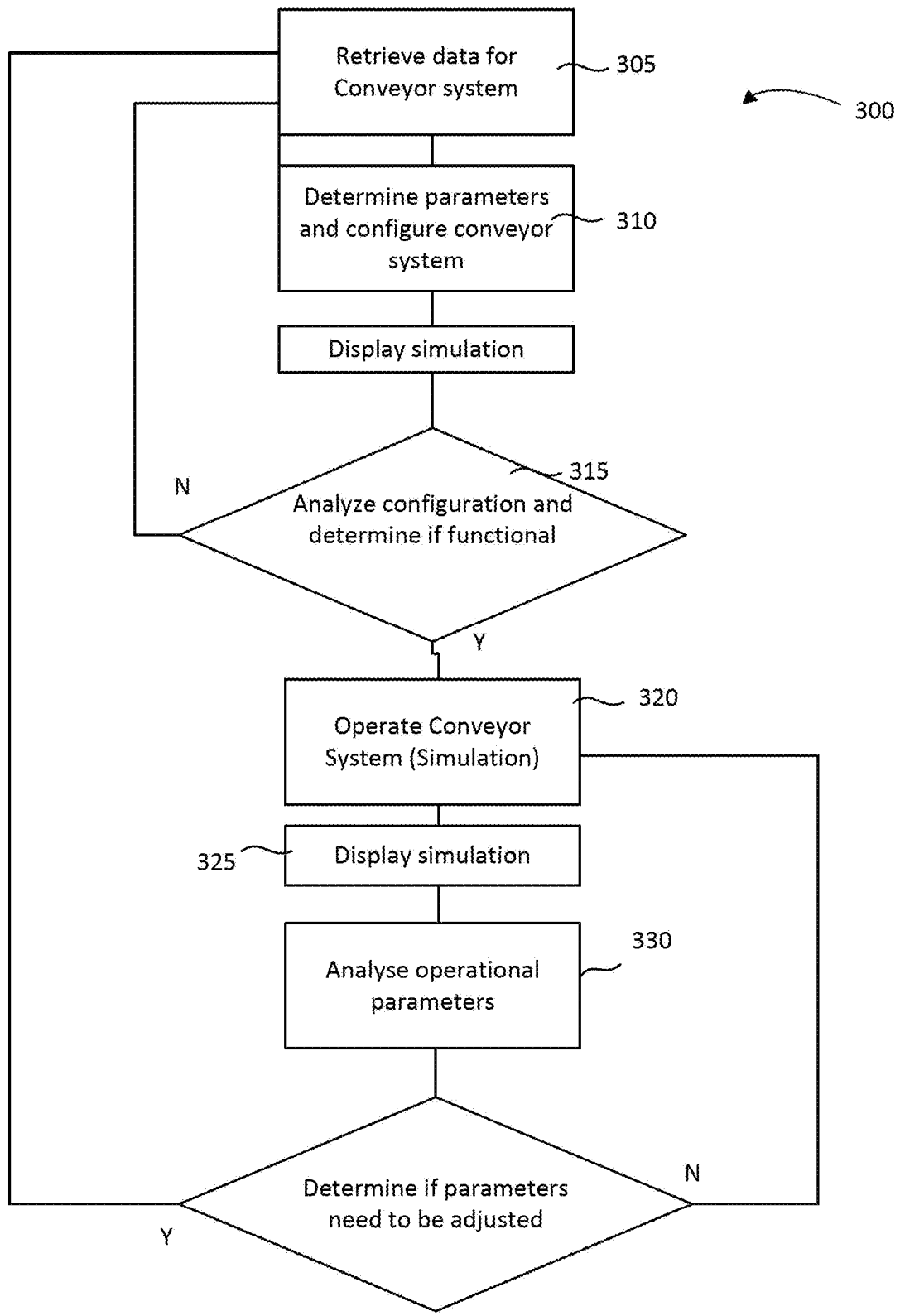
FIG. 3 is a flow chart for a method for conveyor configuration, testing and diagnosis according to an embodiment.

FIG. 3 illustrates a method 300 for conveyor configuration, testing and diagnostics according to an embodiment. At 305, the system receives or determines input data for the conveyor system. At 310, the system determines configuration parameters for the conveyor system based on the input data. In particular, the input data and the configuration parameters determined from the input data may include, for example, size of the conveyor system, flow direction, number of moving elements (pallets), dimensions and weight/mass of the moving elements, general characteristics of the product(s) to be transported by the moving elements (including size and weight/mass), processing or automation stations (size, processing time, and the like), automation station order and/or configuration and the like. In some cases, configuration parameters such as moving element velocity and acceleration may be input data or a predetermined set point, in other cases, the velocity and acceleration may be calculated based on distances, processing time and the like. At 315, the configuration parameters can be analyzed to determine if a functional conveyor system can be configured with those configuration parameters. If no, the method can indicate the nature of the issue and return to retrieve further input and or to re-configure the conveyor system by adjusting the configuration parameters based on machine learning or the like. For example, if the initial configuration specified a number of moving elements that did not allow for the required throughput, the system may add additional moving elements to allow for improved throughput. If the configuration is functional, at 315, the method continues.

At 320, the system begins simulating operation of the configured conveyor and displays the simulation at 325.

At 330, the system monitors and analyses operational parameters, which may be calculated based on operational data produced by the simulation. As these operational parameters are reviewed by the system, the system is configured to model actual operation of a conveyor and note any operational warnings, errors, or issues. In some cases, the system will include a machine learning model that has been prepared based on actual operating conveyor systems. Further description of the preparation and operation of the machine learning model is described below. Generally speaking, the simulation models operating parameters such as power, temperature, movement of moving elements, and the like to represent actual values that could be obtained in a real-world implementation of the configured conveyor.

At 335, the system determines if any operational parameters reveal any alerts (e.g. warnings, faults, errors, issues or the like) that might impact the operation of the conveyor system. If there are any alerts, the system can indicate the nature of the alert and return to retrieve further input and/or to re-configure the conveyor system by adjusting the configuration parameters based on machine learning or the like.

Figure 4:
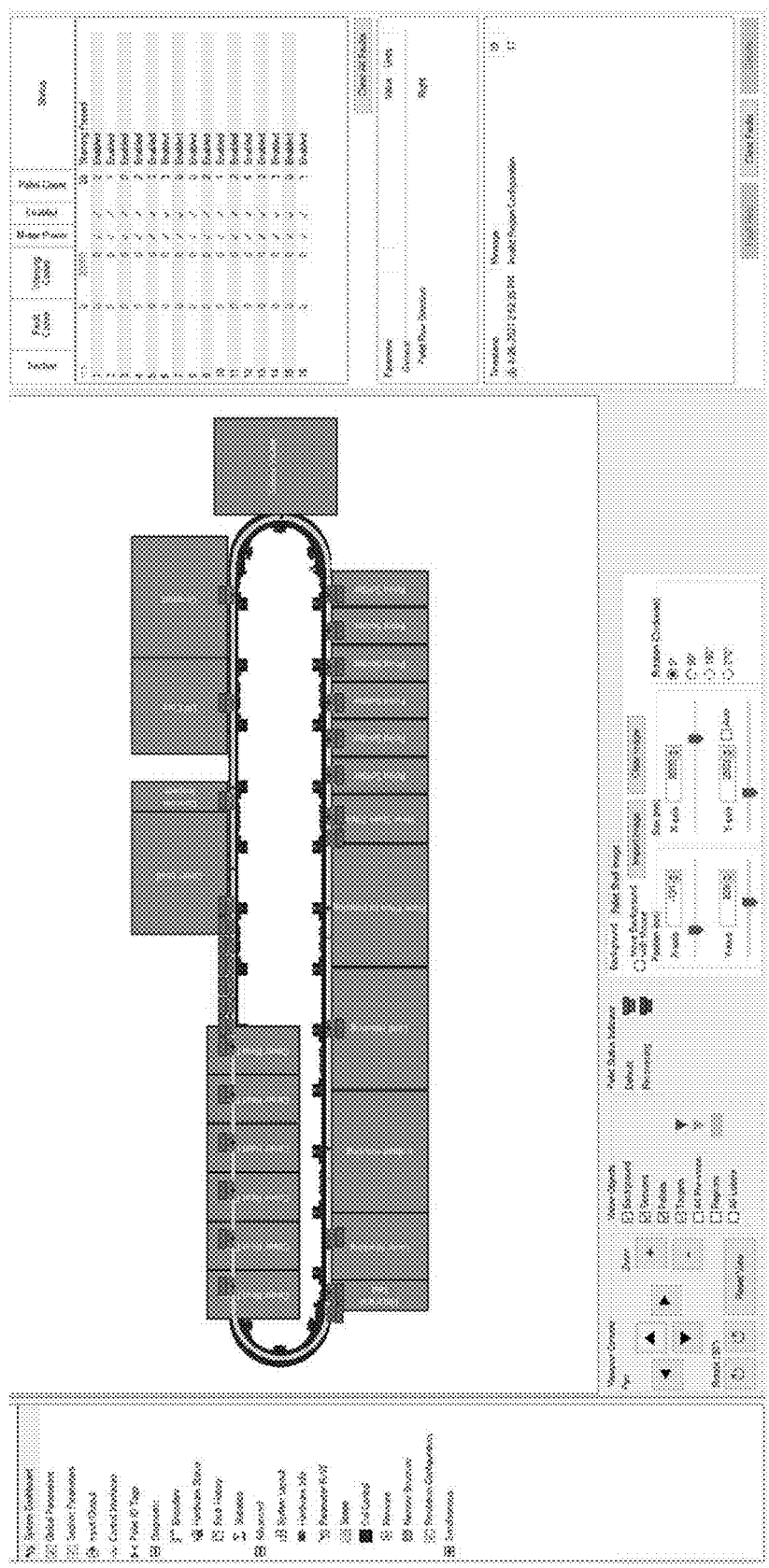
FIG. 4 illustrates an example display screen showing a configured conveyor system and related information.

FIG. 4 illustrates an example display showing a configured conveyor system and related information. As noted above, it is intended that the display be at least somewhat interactive (via a touch screen or other type of input device (not shown)) in that a user is able to drag and drop items such as stations, moving elements or the like in the conveyor system layout to change or reconfigure the configuration. Further, the conveyor system, i.e. the overall layout and/or the conveyor track or the like may either expand or contract based on parameters provided by a user and the configuration parameters associated with the various automation stations or the like. In some cases, the system may be able to be augmented via various features and text or other images may be added to further clarify and augment the simulation. In this example, each of the panels of the display screen illustrate different aspects of the conveyor system and may change depending on what is selected in other panels of the display screen.

Figure 5:
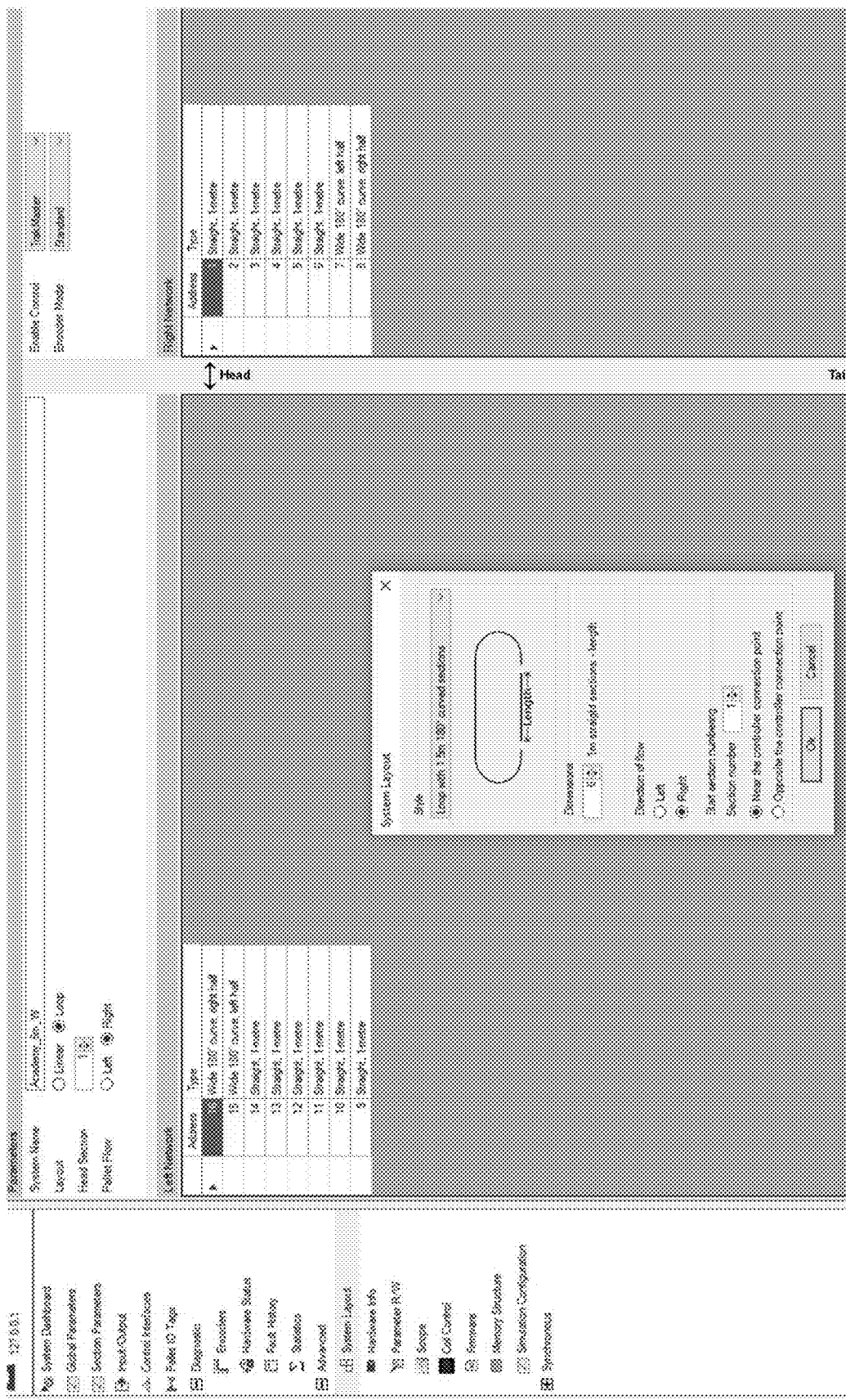
FIG. 5 illustrates an input screen for configuring various parameters related to the conveyor track.

FIG. 5 illustrates an example input screen allowing a user to make changes to configuration parameters or amend previously entered/determined parameters. For example, the sizing (length or the like), type or shape of the conveyor track may be changed. On amending the sizing, the system may update other associated or related parameters to ensure the conveyor is still a functional configuration. The simulation may be updated with the new parameters, or the system may generate an "alert" to notify a user noting that, due to the change in parameter, feature, automation station, or the like, the conveyor may no longer be able to be configured correctly. For example, if there is a minimum spacing required between consecutive automation stations and the length of the conveyor track is reduced to no longer allow for the minimum spacing requirement, the user may be notified by the system that there is a conflicting parameter situation that needs to be addressed. In some cases, the system may not allow for parameters to be updated that would provide for an exception or an unworkable condition.

Figure 6:
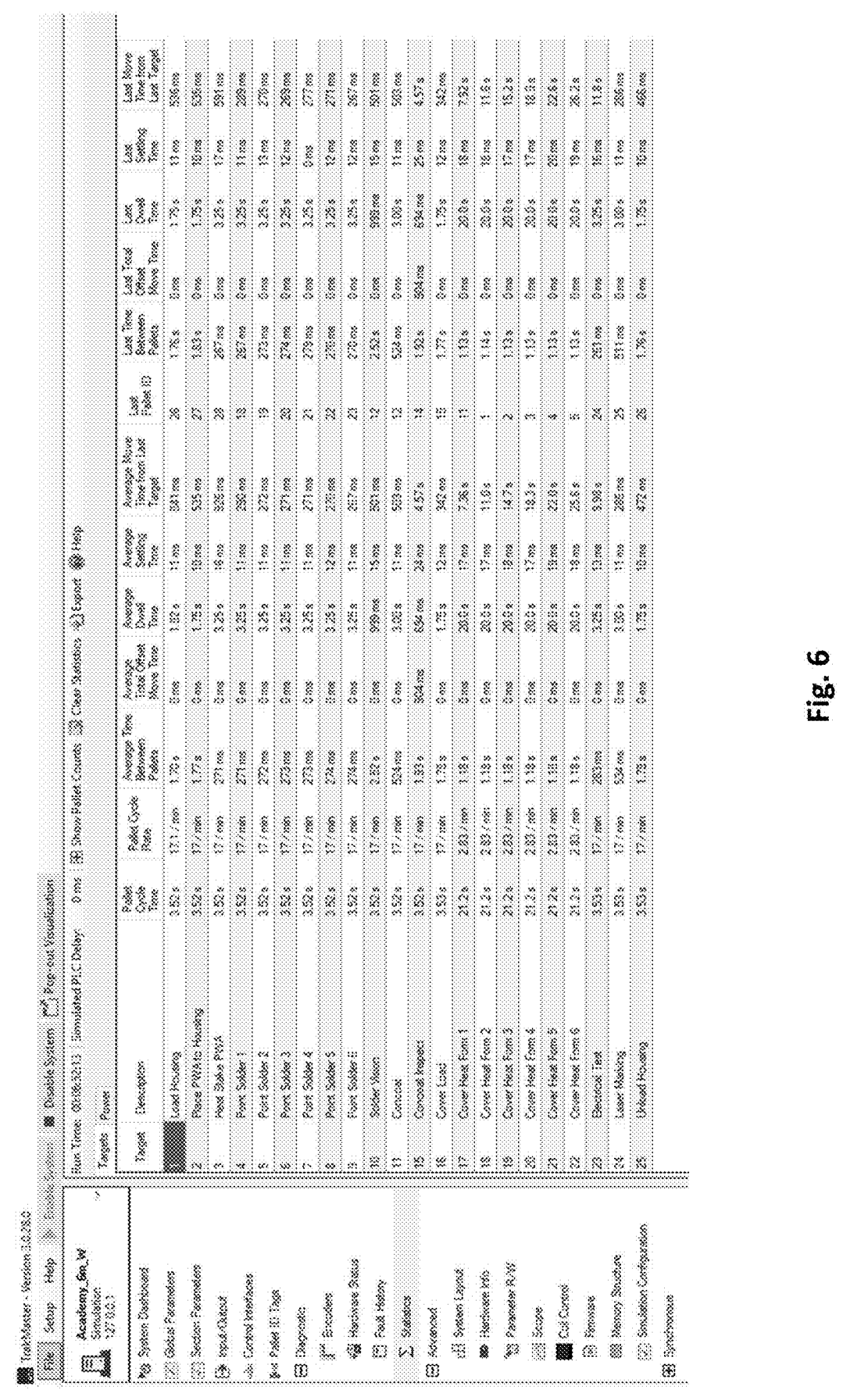

FIG. 6 illustrates some of the data produced by operating a simulation. In this case, the data shown relates to various automation stations configured on the conveyor system. Each automation station can include various operating parameters that can be calculated based on configuration parameters during operation, for example, parameters relating to operation timing, moving element cycle time, time between moving elements and the like. While in operation, the system may track which moving elements are associated with which automation station at any given time as well as whether there are any abnormalities or inconsistencies with the designed and configured conveyor. In some cases, the simulated operation can involve the use of machine learning or artificial intelligence models prepared by comparing with an operational conveyor or the like. In some cases, the simulated operation may also be compared with the operation of an actual conveyor system built based on the designed conveyor system. In this way, the simulation can be used as a "digital twin" for the actual conveyor system and can be used to test or diagnose changes in configuration or issues that may arise in operation of the actual conveyor system.

Figure 7:
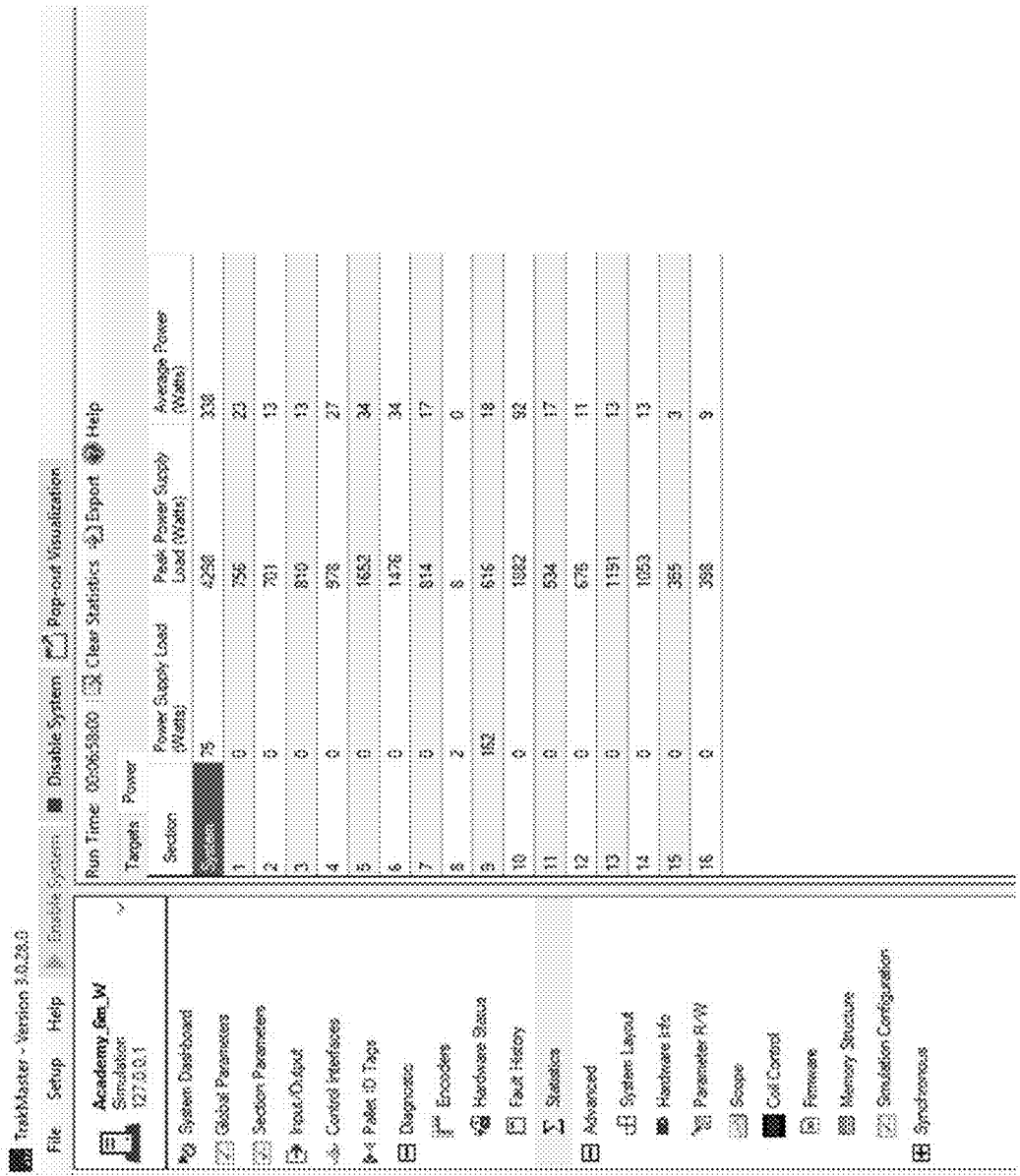
FIG. 7 illustrates the simulated power supply usage by elements of the conveyor system during a simulation.

FIG. 7 illustrates power parameters that may be used by the system for various track sections of the conveyor or for automation stations or the like. Various elements of the conveyor system may include parameters such as a power supply load, a peak power supply load and an average power supply load. From these parameters it can be determined what the power needs may be for a particular configuration. If the power needs are not compatible with the configured power supply available for that element or in the conveyor system itself, the system can generate an alert notifying of any issues and suggest alternatives. For example, the system may indicate where further power may be necessary, may indicate that removing a particular automation station would be beneficial, may suggest a peak speed or acceleration in order to reduce power needs, recommend a different size/mass moving element, or the like. In some cases, the system can be configured to determine a least disruptive solution to bring related parameters in line with any structural constraints.

Figure 8:
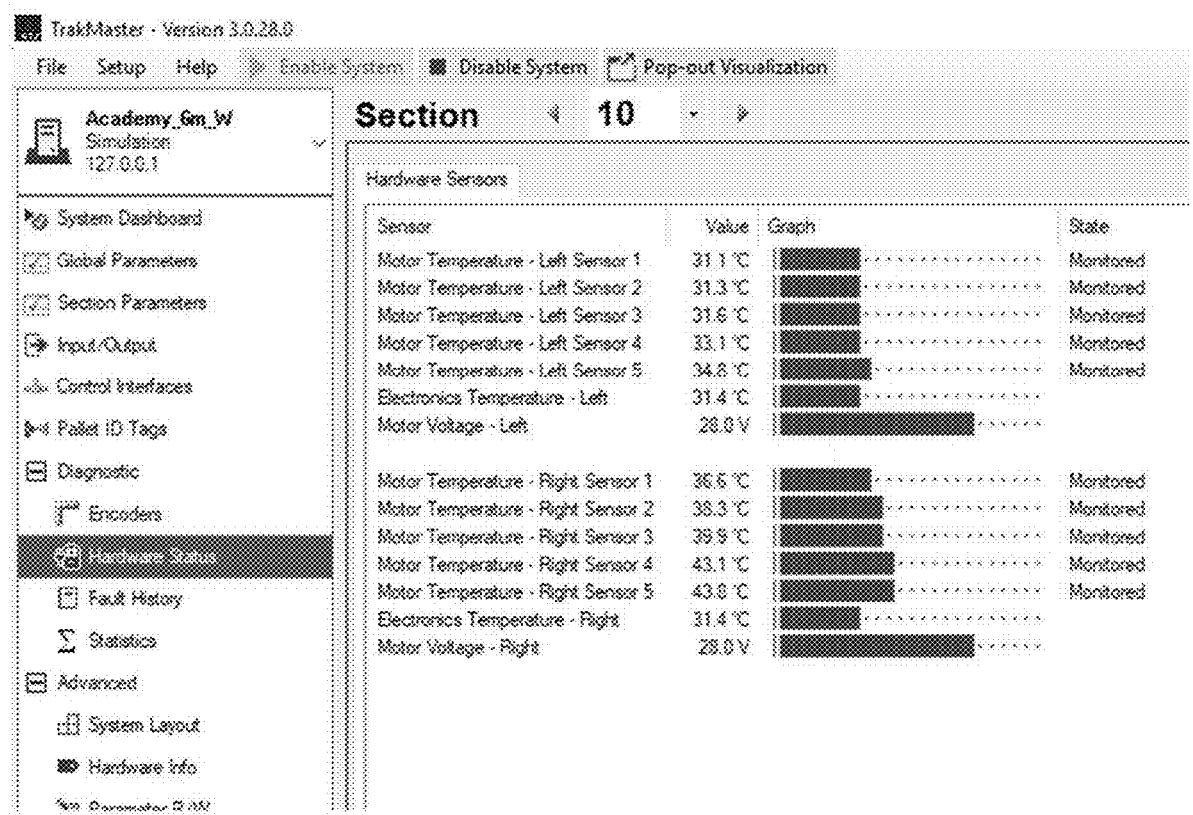
FIG. 8 illustrates heat profiles exhibited by elements of the conveyor system during a simulation.

FIG. 8 illustrates a temperature simulation display according to an embodiment. When the system is running a simulation, the system can determine and monitor operating parameters to test the conveyor system and determine if there are any issues that arise during operation. One of the operating parameters that can be monitored is the temperature of elements of the conveyor system. For example, running the simulation can determine, for example, the heat profiles and temperatures (for example, steady state) exhibited by the elements during operation. In some cases, if the system determines there will be too much heat the user may be alerted to the issue and be provided with potential alternatives to the current configuration. For example, the system may provide example cooling solutions such as air cooling, liquid cooling, passive cooling or the like, or alternatively, may provide operational changes that may provide cooling, such as reduced speeds or acceleration, using reduced speeds or acceleration when not needed for throughput, adjusting positioning of moving elements, general motion/trajectory planning, adjusting (generally reducing) the pallet or product mass, or the like. Additional detail on determining and monitoring temperature is provided below.

Figure 9:
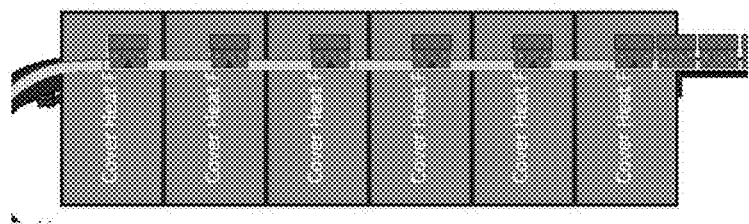
FIG. 9 illustrates moving elements configured to move into various automation stations during the configuration of the conveyor.

FIG. 9 illustrates a grouping of automation stations together in a format known as "six-up" such that each of six automation station performs the same operation but in a parallel format. In some cases, the system may be able to determine parallel processing arrangements based on input parameters, such as, as shown in FIG. 9, when a user specifies six-up processing. In this situation, the system provides six similar stations and arranges the sizing and the requirements for the conveyor system such that six moving elements queue and then enter the automation stations six at a time. Alternatively, if a user specifies a throughput that is higher than the cycle time of a particular automation station, the system may automatically provide for a plurality of a type of automation station and adjust the size of the conveyor system accordingly. In some cases, the system may also, by running simulations, determine, for example, issues related to spacing, bottlenecks, heat profiles, power requirements and the like. As such, the system is intended to provide testing, diagnostics and optimization to the design and configuration of a conveyor system without any requirement of building or otherwise investing in capital expenditures prior to the simulation meeting the requirements.

Figure 10:
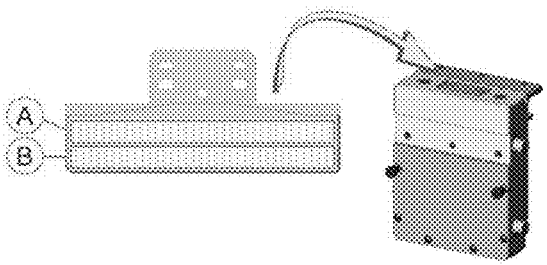
FIG. 10 illustrates detail on a feature of an automation equipment according to an embodiment.
Figure 10:
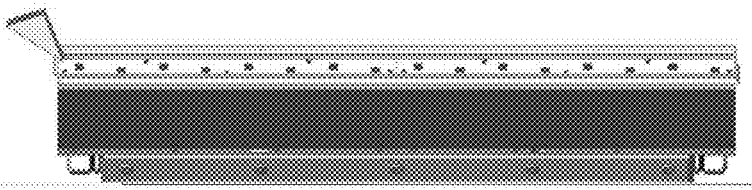

FIG. 10 illustrates a self-help feature of the system in which the system may present information to a user with further detail about a feature or options for the conveyor system and the operation/benefits of including these features. Having detail regarding various features of the conveyor system and its operation and maintenance allows any user access to information to assist with the configuration of the conveyor system. In the particular example of FIG. 10, the system is providing information related to encoder strip alignment.

Embodiments of the method and system detailed herein are further intended to be used in testing the conveyor system, diagnosing conveyor system issues and optimization of the conveyor system. The system is intended to simulate the operation of the conveyor system and determine the impact of operation on various operational parameters. In particular, the system may review operational parameters such as power and thermal measurements, pallet placement, throughput, automation station configuration, and the like. In some cases, the system may include machine learning or artificial intelligence modules that can learn from feedback from actual operational conveyor systems, and in particular linear motor conveyor systems, to determine potential alerts (e.g. warnings, faults, errors and the like) and provide for troubleshooting. As noted herein, a simulation can also serve as a "digital twin" for the actual conveyor system once it is produced. This will allow for changes to be made to the simulation in advance in order to check if a change should be made to the actual conveyor system.

Figures 11, 12:
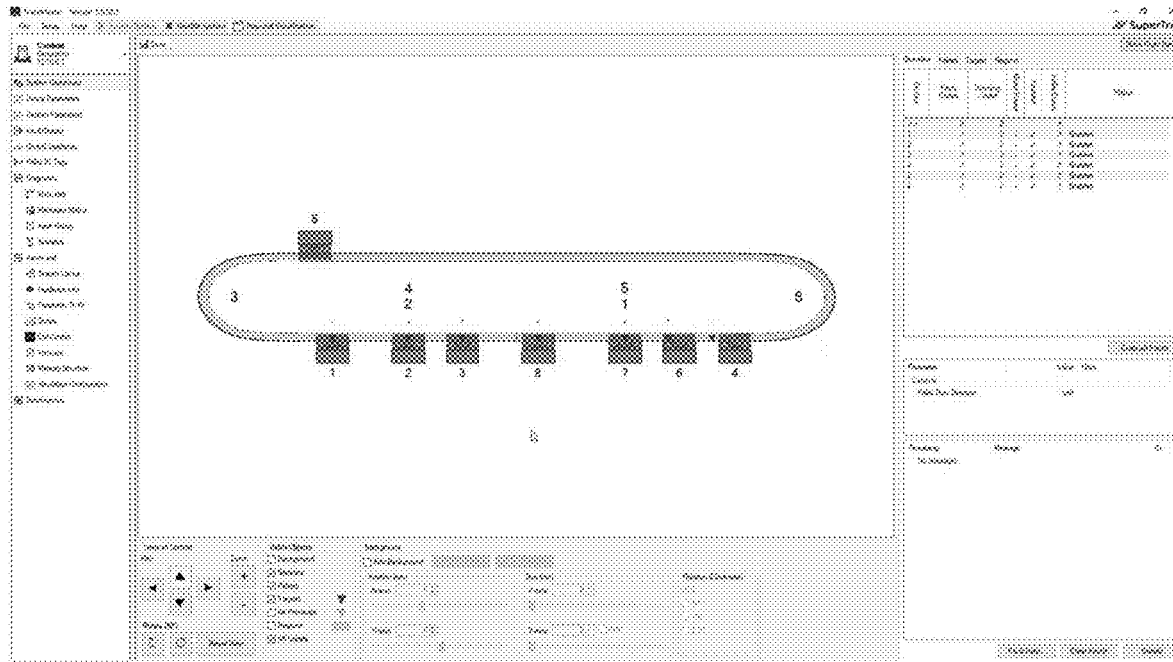
FIG. 11 illustrates an example of a simulation of a conveyor system in which some elements have been hidden.
FIG. 12 illustrates various alerts (warnings, faults, errors, or the like) provided by an embodiment of the system.

FIG. 11 illustrates an example display of the simulated operation of a conveyor system. In this particular case, the display screen has been set to just show moving elements and target locations with the automation stations hidden. In some cases, the display may provide alerts to highlight areas for follow up or correction/changes and may provide for a button or the like to clear all alerts/faults that are known. In some cases, the display may illustrate targets for the moving elements or the like to show when a moving element is positioned at a target. It is intended that the display provides for a detailed view of a live simulation of a configured conveyor system.

FIG. 12 illustrates alerts (i.e. a list of warnings, faults, errors and the like) that may be generated by the system during the running of the simulation and reported to a user or acted on by the system itself. The system may include weighting functions in order to determine the level of alert (i.e. critical errors compared to other types of errors, faults or warnings or the like). It is intended that a user will be provided with detailed information based on simulation of operation of the conveyor system and may then determine issues that need to be addressed and issues that may just need to be reviewed but may not require immediate attention. In some cases, the system may also suggest a potential fix for any alerts. For example, as described further below, if there is a temperature alert, the system may suggest the inclusion of a cooling system or the like. In still other cases, the system may implement a fix and reconfigure the conveyor system accordingly in response to an alert. For example, if there is a temperature error and it is possible to drive the moving elements with less speed, acceleration (power) but maintain throughput, the system may reconfigure the conveyor system in this way and continue operating the simulation to determine the impact.

Figure 13:
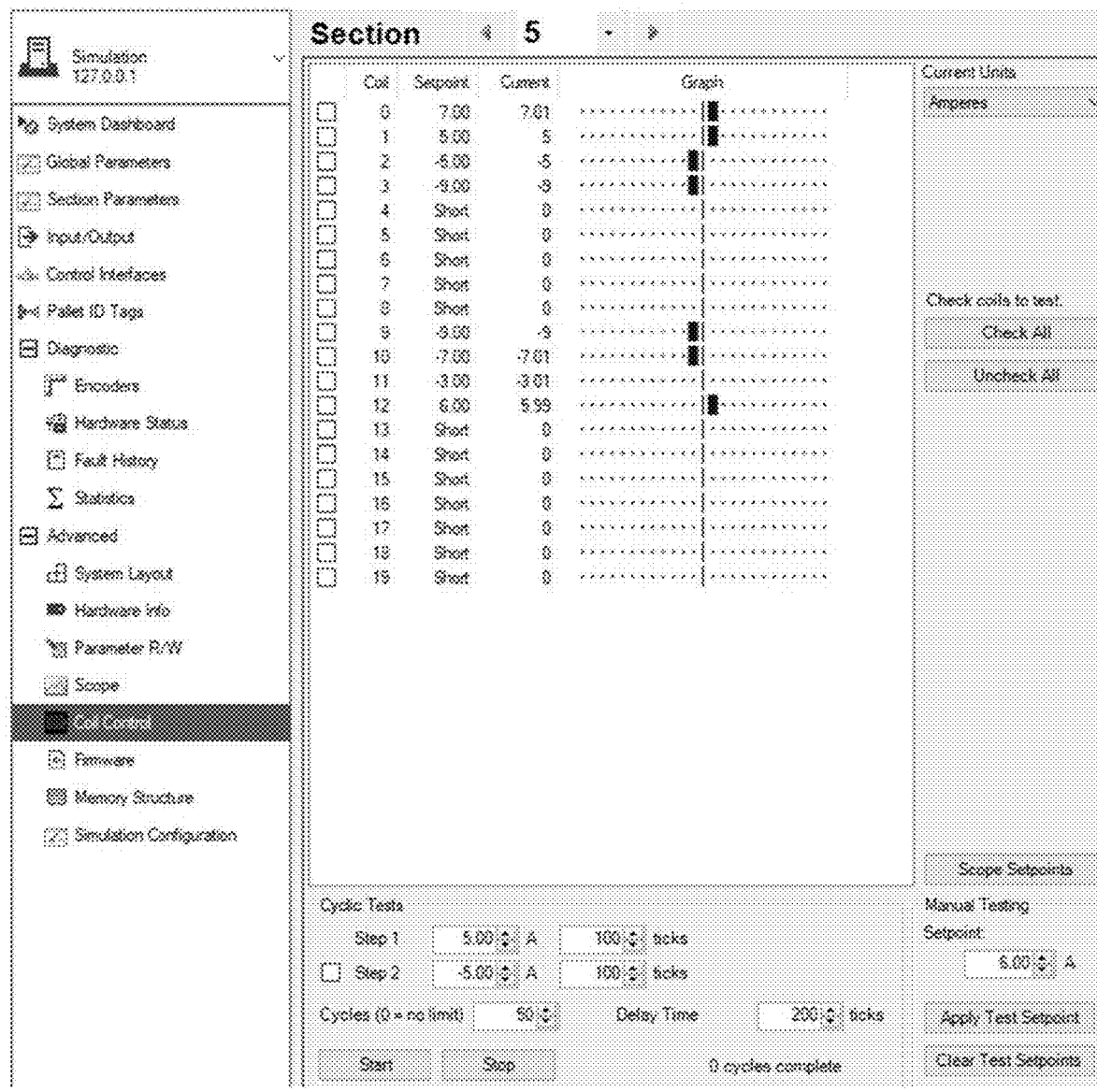
FIG. 13 illustrates control data from a conveyor track section provided by an embodiment of the system.

In an example, FIG. 13 illustrates a coil control display for a linear motor conveyor system being diagnosed by the system. In actual (digital twin) or simulated (based on a model including "noise" in the coils or the like) operation, the coils for each track section may be monitored and a set point and current may be determined for each track section of the linear motor conveyor. In FIG. 13, the system illustrates/notifies the user if any coil is varying from a setpoint and can include thresholds or the like to indicate alerts within the conveyor system. As it may be difficult for conventional methods to diagnose at this level of granularity, embodiments of the system and method herein are intended to make it easier to detect alerts related to the conveyor system.

Figure 14A:
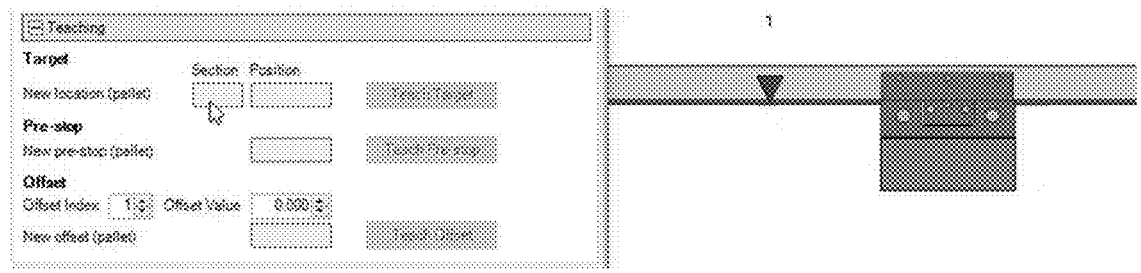
FIGS. 14A and 14B illustrate teaching a moving element proper placement in relation to a target set point (related to an automation station)
Figure 14B:
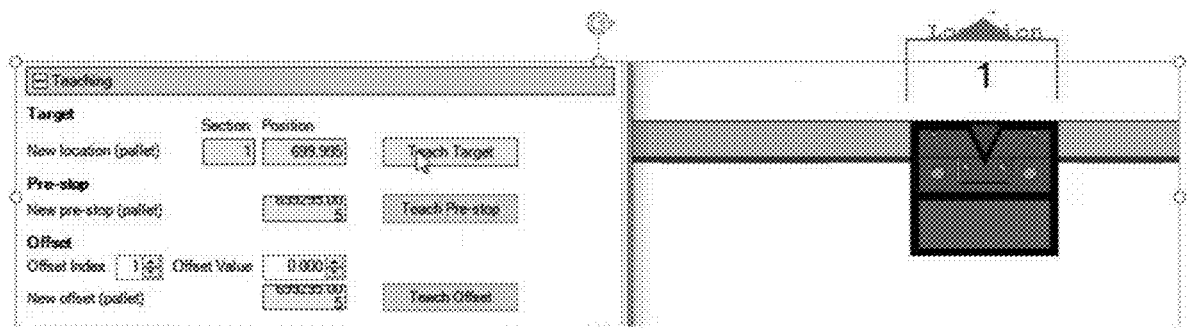

In another example, FIGS. 14A and 14B illustrate moving element target and offset configuration. In this example, the input data received during system configuration may not have included moving element location in relation to automation station 1. FIG. 14A illustrates this situation and FIG. 14B illustrates teaching (or setting/inputting) the system a target for the moving element for automation station 1. In some cases, there may also be offsets for the moving element that indicate, for example, movement of the moving element at the automation station between differing targets or can be used in some cases to correct errors in the positioning of particular moving elements that may have differences from other moving elements. For example, if machine learning notifies the system that the position of a moving element may be incorrect for the automation station based on power provided to the coils, manufacturing tolerances of the moving element, or the like, the system may amend the offset for the moving element in order for the moving element to be properly aligned in position at the automation station. As with FIG. 13, this may be provided based on either a model in the simulated conveyor system or based on data/operation as a digital twin of an actual conveyor system.

It is intended that the system may store or otherwise archive parameters for the various elements of the conveyor system (conveyor track, automation stations, and the like) such that the configuration may be recalled and/or amended at any given time. Further, the system may provide users with context sensitive help. In particular, if the system detects an alert, the system may provide help or troubleshooting data to the user and indicate location and parameters that are currently failing. In some cases, the system may also assist with determining a maintenance schedule for an actual conveyor system (for example, when available as a digital twin of the actual conveyor system).

It is intended that the system for conveyor configuration and diagnostics provides detail and a level of granularity which is intended to provide users insight with respect to the functioning and any alerts (faults, warnings, errors or the like) related to the conveyor system. Embodiments of the system and method herein are intended to provide for users to easily configure a conveyor system, and in particular, a linear motor conveyor system, with a plurality of automation stations given input data and configuration parameters and then run a simulation of the configured conveyor system in order to determine operational parameters and features that may impact operation of the conveyor system. Further, embodiments herein are intended to allow for a digital twin (at least 2D) of an actual conveyor system to be available for configuration, testing and diagnostic purposes by simulating the operation of the actual conveyor system. In at least the digital twin situation, embodiments of the system and method herein may be used to benchmark elements of the conveyor system and be used to provide predictive maintenance alerts and the like.

As an example of the use of embodiments herein to monitor operating parameters and generate alerts, the following description will expand on the way that embodiments of the system and method herein can configure, monitor and diagnose a parameter such as temperature of a conveyor system. For this example, the conveyor system is a linear motor conveyor system having a plurality of track sections, with each track section having a linear motor, which includes electrical coils that drive moving elements on the track and electrical circuitry that control the electrical coils. It will be understood that similar principles can be applied to other conveyor systems and parameters to be monitored.

In a physical track, motor temperatures are typically measured by thermistors mounted in the track structure. A typical track section will have, for example, one thermistor per coil pair but this can be set up according to the actual track in use. For example, a curved track may have more or fewer thermistors. Embodiments herein are provided with a temperature simulation model that is intended to predict thermistor temperature readings using operational data from a running simulation. As temperatures will change during operation, it can be necessary for a simulation to run for a predetermined amount of time (for example, 4-12 hours to reach steady state or as appropriate).

In order to predict temperatures in the track, it is necessary to first determine operational data that can be generally co-related to temperature changes in the conveyor system, for example, the heat generating systems on the track. Since some of the main heat generating comes from the power used by the electronics (control and coil) and from movement of the moving elements (which is also related to the power of the coils), it was determined that power usage could be usefully co-related to temperature. Further, as current squared in electrical systems is directly related to power, and current is one of the operating data that is used in the simulation, then current squared (I^2) could be used to predict temperature changes. In a particular case, the actual operating data used as input to the model may be called "features" and various features may be included in the model. For example, the following are example features that might be used:

Feat 1—I^2: the sum of simulated I^2 values for motor coil pairs.

Feat 2—Sec_N/Sec_S/Sec_W: indicates whether a particular sample either is from straight section or narrow section or wide section.

Feat 3—Avg I^2: an average of I^2 values for a particular section.

Feat 4—I^2 (n−1): the I^2 value of the previous motor coil pair of a certain motor coil pair.

Feat 5—I^2 (n+1): the I^2 value of the next motor coil pair of a certain motor coil pair.

It will be understood that various other features may also be included to further tune the model to provide more accurate results.

Further, the simulated I^2 values can be calculated using a physics model including various physics parameters that can affect the amount of power required. Examples of the various physics parameters may include: motion parameters (speed, acceleration, and the like), mass (pallet/product), data on resistance and coil efficiency, coefficients of friction, air resistance, and the like. In some cases, these physics parameters may be considered a single value, changing in a particular way (e.g. simulating noise or other factors), or, in some cases, physics parameters may be modelled based on training from actual conveyor systems. It will be understood that a more detailed the physics model can provide a more detailed simulated I^2 and thus a more detailed overall simulation.

With regard to motor/coil temperatures, it is expected that features like the average coil current consumption of the coils in the immediate proximity of the sensors will have a generally linear relationship to heat generated in the motor and that, an average coil current consumption of neighboring coils/sections(s) will also have a generally linear relationship to the heat generated in the neighbouring motors. Other features that may be used include one or a combination of: max or average pallet/moving element velocity; pallets per minute; max or average pallet acceleration; pallet mass, peak coil current consumption, average pallet acceleration, max pallet acceleration; average pallet velocity, max pallet velocity, total current left or right, distance left or right (measured by coils or by sections, or the like), type of track section, predicted temperatures of other sections as feedback, or the like. Features may be calculated per coil or the like.

In some cases, a factor selection algorithm can be used to determine which features/factors may have the most impact on the result of the modelling in order to narrow the number of features/factors used by the machine learning model.

In an initial test, a model was prepared that is intended to predict steady state motor and electronics temperatures. It was determined that transient temperature readings are generally not as problematic as when there is too high a steady state temperature. It was further determined that temperature issues only typically arise as the motor and electronic temperatures rise above 40 degrees Celcius. As various models develop further, it may be possible to model or predict transient and lower temperatures as well.

For this initial test, it was determined that a goal would be to have an accuracy of +/−5 degrees Celcius for the simulated temperature as compared to actual values. It will be understood that other accuracy levels can be targeted and that accuracy levels may be more important at certain temperatures than at others. For example, once temperatures are too high, it may not matter how much above that level the temperature rises as the simulation should stop once the alert is determined. As another example, in some models, the coil data may be limited to a predetermined temperature (e.g. 55 Deg C.) due to electronic temperature alerts that may make it difficult to accurately predict temperature scenarios above the predetermined level.

The model is intended to be applied to various track section types, such as, for example, Straight, Narrow, Wide, Curved, and the like. The model is also intended to be applied with other variations such as different pallet masses, different motion profiles, different physical track types, different guarding on the track and the like.

The output from the model will generally be steady state motor temperature estimates and steady state electronics temperature estimates, which are used to determine if there is a risk of overheating or the like by comparison with predetermined thresholds determined from actual operating conveyor systems. In some tests, it was determined that static coil tests were not as accurate, calibration of individual temperature sensors may be required, guarding and enclosures need to be simulated in production state to more accurately replicate production heat dissipation, and air flow, external cooling and externally heating can be modified/controlled to allow for a more accurate model.

A model can use various different machine learning or AI methods for the training and analysis. For example, random forest regression, linear regression, polynomial regression, decision tree regression, deep neural networks, and the like. In this particular test, a random forest regressor was used.

A model was prepared for motor coils and validated with 5-fold cross validation having train-test split 80-20 in each fold and according to the following characteristics: (Exp 1) Train-Test split: 80%-20%; No. of Training Samples: 5230; No. of Test samples: 1139; Min Training Temp: 160.62; Max Training Temp: 28.01; RMSE for samples at 40+ degrees Celcius: 2.34; MAE for samples at 40+ degrees Celcius: 1.61; Max Absolute Error: 11.65; Number of temp 40+ samples on average (average of 5 folds): 720; No of erroneous samples: 11; Success Rate: 98.48%. (Exp 2) Train-Test split: 80%-20%; No. of Training Samples: 5166; No. of Test samples: 1139; Min Training Temp: 28.01; Max Training Temp: 105.23; RMSE for samples at 40+ degrees Celcius: 2.13; MAE for samples at 40+ degrees Celcius: 1.54; Max Absolute Error: 13.39; Number of temp 40+ samples on average (average of 5 folds): 751; No of erroneous samples: 18; Success Rate: 97.61%.

Another model for predicting electronics temperatures was trained and validated with 10-fold cross validation. Each fold had 668 training samples and 66 test samples. The average root mean squared error (rinse) over 10 folds was 2.75 deg C., mean absolute error (mae) was 1.86 deg C. with success rate 96.52%.

Figure 15:
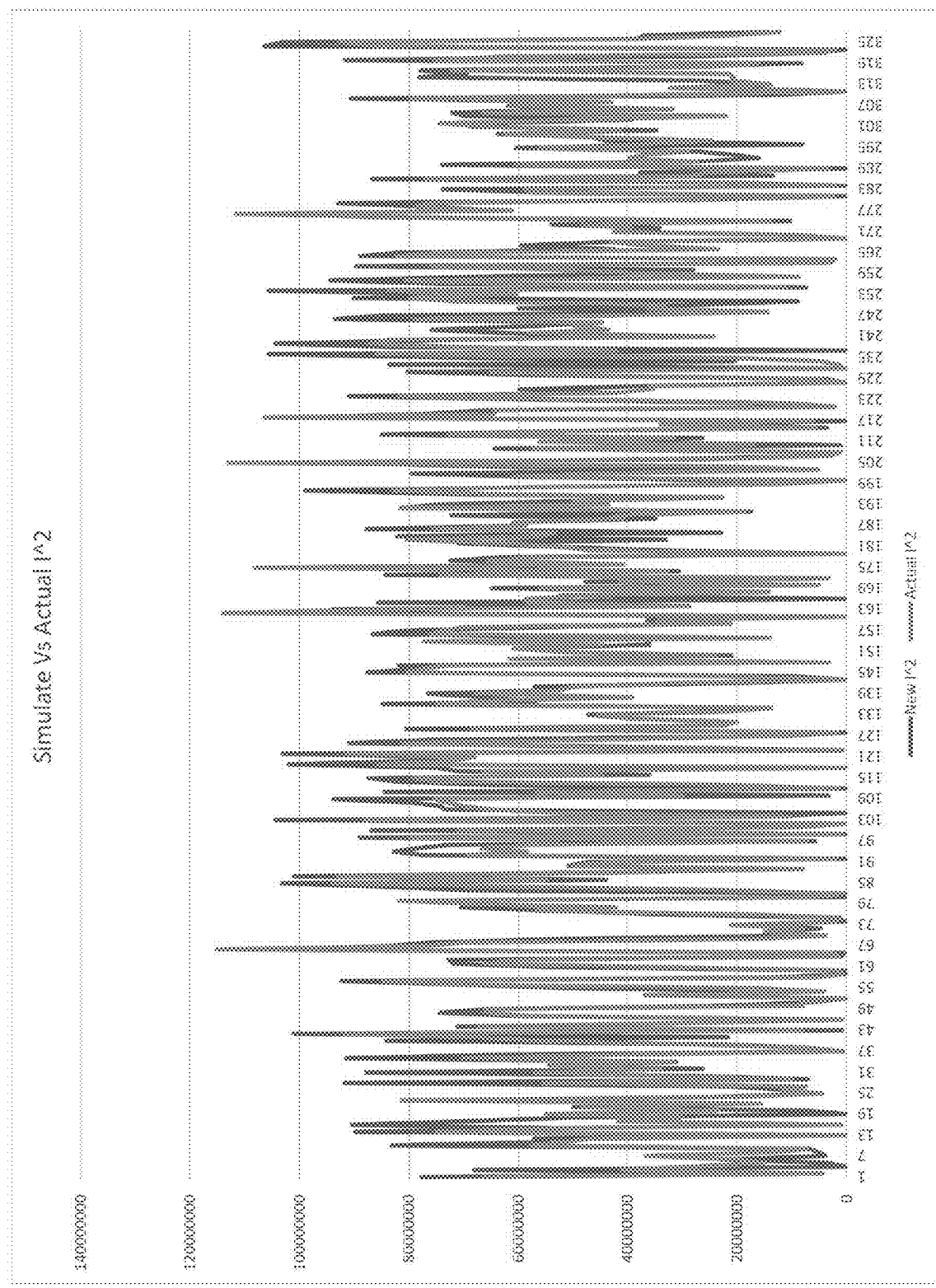
FIG. 15 is a graph illustrating the results of a machine learning model comparing simulated vs. actual data.
Figure 16:
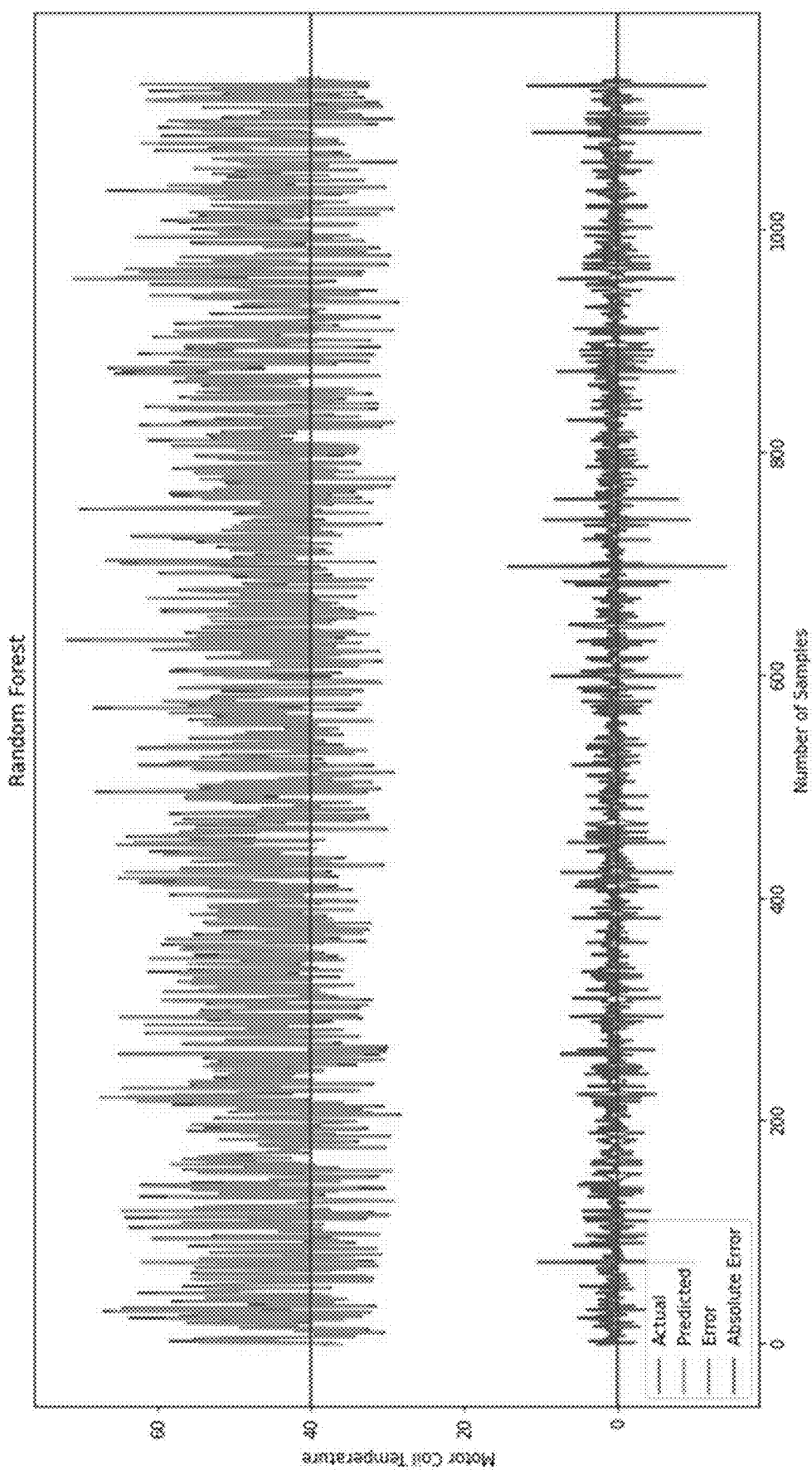
FIG. 16 illustrates graphs showing the results of a random forest machine learning model for a motor coil temperature of a conveyor simulation.

The results from an initial model such as this are shown in FIG. 15, which illustrates the predicted vs. actual values of I^2 for a conveyor system, and FIG. 16, which illustrates the predicted vs. actual values for motor coil temperature as well as the error involved.

Other models may also incorporate the option to specify various cooling options that may be added to the conveyor system, such as, for example: none, convection, forced air, liquid cooling and the like. Within the simulation, a user can add or remove the cooling options to see the impact on temperature.

Once the model has been trained, the model can be executed as a part of a simulation of a conveyor system that a user has created/configured. In the configured conveyor system, one of the configuration parameters can include a default ambient temperature (or example, 22 Deg Celcius.). In at least some cases, the model may assume that all predicted temperatures have a linear relationship to ambient, or, for example, a linear relationship within a temperature range such as 10 Deg C. to 40 Deg C. or the like. In this way, the model can be based on an offset from a variable that represents the input ambient temperature parameter. In some cases, a user may not know ambient of the conveyor system in advance, but the user will generally know whether the conveyor system is in an air conditioned plant or not. Further, the user will generally understand how much control is available over the ambient temperature. Even if these are unknowns, the model and simulation can provide results at a predetermined ambient temperature (e.g. room temperature/22 Deg C., or the like), and the user can assess the risk due to any reasonably similar ambient temperature by adding/subtracting an incremental amount from the results. A useful factor for a user to know about ambient is that liquid cooling is one of the only options that is independent of ambient temperature.

As the simulation and model are running, the simulation controller has quite a variety and quantity of data available. While a factor like the average steady state current (and thus power consumed) per coil is available and can be used by the model to estimate resulting temperature, other data is also available to seek to enhance accuracy. For example, the simulation controller has access to accelerations, velocities and stopping locations that are part of the configuration data and parameters, but also, through the running simulation, can also determines what speeds pallets actually reach, how frequently they stop (due to collision avoidance or the like), and what demands are put on the motor coils. While average power per coil may relate to elements of trajectory/payload/application, other data can also be used to more accurately model these aspects of the simulation. As such, a more accurate determination of temperature may be calculated. In some cases, these other data and parameters can also be used to model other operational parameters including, in some cases, the ability to build "noise" into the simulation, such as potential variations in power delivered due to differences in coils or differences in stopping positions of moving elements due to differences in magnet or machine tolerances, or the like.

In the preceding description, for purposes of explanation, numerous details are set forth in order to provide a thorough understanding of the embodiments herein. However, it will be apparent to one skilled in the art that these specific details may not be required. In other instances, well-known structures or circuits may be shown in block diagram form in order not to obscure the overall system or method. For example, specific details are not provided as to whether the embodiments described herein are implemented as a software routine, hardware circuit, firmware, or a combination thereof.

Embodiments can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment. Those of ordinary skill in the art will appreciate that other instructions and operations necessary to implement the described embodiments can also be stored on the machine-readable medium. Software running from the machine-readable medium can interface with circuitry to perform the described tasks.

The above-described embodiments are intended to be examples only. Elements of one embodiment may be used with other embodiments and not all elements may be required in each embodiment. Alterations, modifications and variations can be effected to the particular embodiments by those of skill in the art without departing from the scope of the invention, which is defined solely by the claims appended hereto.

What is claimed is:

1. A method for conveyor configuration and testing, the method comprising:
    receive input data relating to configuration of a conveyor system;
    prepare a simulation of the configured conveyor system;
    operate the simulation of the conveyor system;
    determine at least one operational parameter related to the conveyor system to be monitored;
    monitor the at least one operational parameter during operation of the simulation of the conveyor system using a machine learning model, the machine learning model comprising:
        at least one factor comprising current levels in the conveyor system;
        a physics model for determining simulated current; and
        a regression model for determining temperature based on the simulated current;
    determine if the configuration of the conveyor system needs to be adjusted based on the monitored operational parameter;
    if the configuration needs to be adjusted, automatically make an adjustment and return to operate the simulation of the conveyor system; and
    continue the simulation until otherwise terminated.

2. A method according to claim 1, wherein the at least one operational parameter comprises at least one of power usage per motor and temperature.

3. A method according to claim 1, wherein the determine if the configuration of the conveyor needs to be adjusted comprises:
    determine if one of the operational parameters is outside of a predetermined range; and
    determine a change in at least one configuration parameter in order to change the operational parameter.

4. A method according to claim 1, wherein the automatically make an adjustment comprises:
    adding an additional element to the configuration in order to change the operational parameter.

5. A method for conveyor configuration and testing, the method comprising:
    receive input data relating to configuration of a conveyor system;
    determine configuration parameters related to the conveyor system based on the input data;
    configure the conveyor system based on the configuration parameters;
    provide for changes to the configuration parameters;
    display the configuration of the conveyor system;
    simulate operation of the conveyor system;
    monitor at least one operational parameter related to the conveyor system, wherein the at least one operational parameter is calculated based on the configuration parameters and a machine learning model based on operational data from actual conveyors, wherein the machine learning model comprises:
        at least one factor comprising current levels in the conveyor system;
        a physics model for determining simulated current; and
        a regression model for determining temperature based on the simulated current;
    determine if configuration parameters need to be adjusted based on the at least one operational parameter;
    if the configuration parameters need to be adjusted, return to receive input data, otherwise, continue the simulation until otherwise terminated.

6. A method according to claim 5, wherein the at lease one operational parameter comprises at least one of power usage per motor and temperature.

7. A method according to claim 5, wherein the provide for changes comprises:
    determine if the configuration parameters allow a functional conveyor system; and
    allow adjustment of configuration parameters by returning to receive input data.

8. A method according to claim 5, wherein the determine if configuration parameters need to be adjusted comprises:
    determine if the at least one operational parameter is outside of a predetermined range; and
    suggest a change in at least one configuration parameter in order to change the at least one operational parameter.

9. A method according to claim 8, wherein the suggest a change in at least one configuration parameter comprises:
    suggest an additional element to add to the configuration in order to change the at least one operational parameter.

10. A system for conveyor configuration and testing, the system comprising:
    a data acquisition module configured to receive input data relating to configuration of a conveyor system;
    a configuration module configured to prepare a digital two-dimensional model of a conveyor system;
    a simulation module configured to run a simulation of the configured conveyor system, monitor at least one operational parameter using a machine learning model during operation of the simulation of the conveyor system, wherein the machine learning module comprises: at least one factor comprising current levels in the conveyor system; a physics model for determining simulated current; and a regression model for determining temperature based on the simulated current, and determine if the configuration of the conveyor system needs to be adjusted based on the monitored at least one operational parameter; and
    a results module configured to, if the configuration needs to be adjusted, automatically make an adjustment and return control to the configuration module, otherwise, to return to the simulation module to continue the simulation until otherwise terminated.

11. A system according to claim 10, wherein the results module is configured to automatically make an adjustment by adding an additional element to the configuration in order to change the at least one operational parameter.

12. A system according to claim 10, wherein the at least one operational parameter comprises at least one of power usage per motor and temperature.

* * * * *